Oct. 28, 1969    R. O. SANDERS    3,475,058
CONVEYING APPARATUS
Filed March 12, 1968
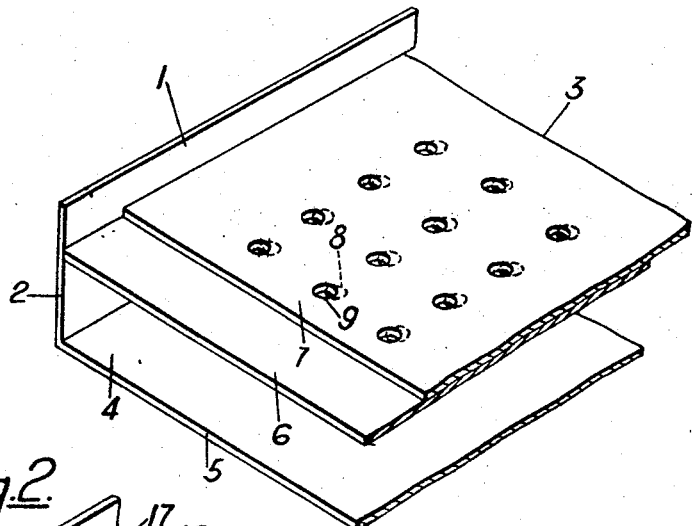
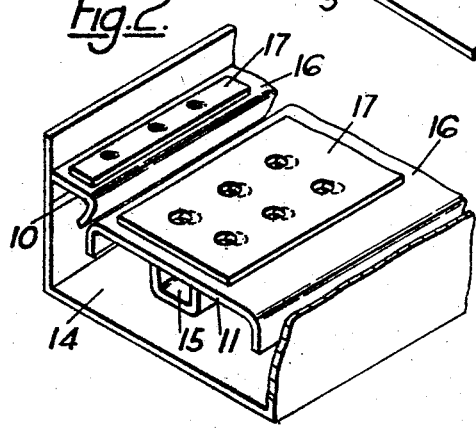
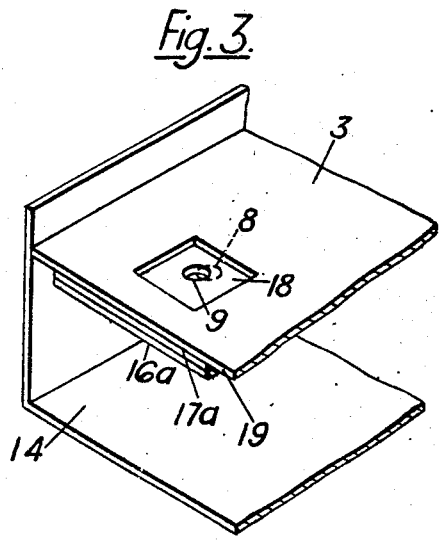
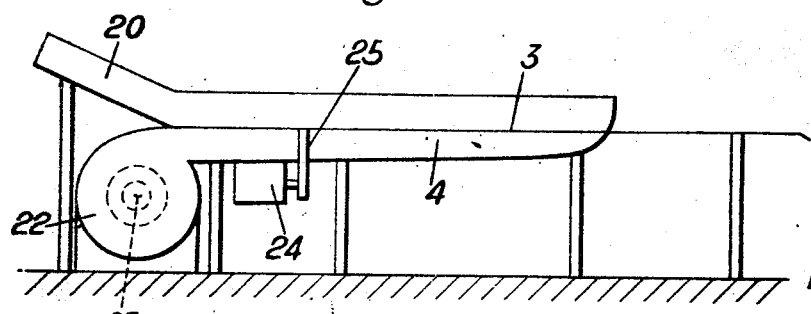
Inventor
ROY O. SANDERS
By
Attorneys United States Patent Office
3,475,058
Patented Oct. 28, 1969

3,475,058
CONVEYING APPARATUS
Roy Oliver Sanders, 115 Beechwood Ave.,
St. Albans, Hertfordshire, England
Filed Mar. 12, 1968, Ser. No. 712,401
Claims priority application Great Britain, Mar. 13, 1967, 11,771/67
Int. Cl. B65g 53/04
U.S. Cl. 302—29
7 Claims

ABSTRACT OF THE DISCLOSURE

A gaseous lift conveyor having an article conveying track 3 with two superposed plates 6, 7, devices to cause relative movement between the plates, a plurality of apertures 8, 9 in the plates the overlap of which can be varied by relative movement of the plates, and a plenum chamber 14 supplied with pressure fluid and communicating with the apertures. The plates may be covered by a top plate 3 with recesses in which the apertures in the upper plate 7 are disposed. Additional apertures may also be provided.

BACKGROUND OF THE INVENTION

(1) Field of the invention

This invention relates to air lift conveyors employed in conveying articles including materials over a surface in a stream of air or other gaseous medium which may in addition be at a suitable temperature to cool, heat, or dry the articles or materials as they are conveyed. The articles may be objects such as sheets of paper cardboard, or hardboard, strips of materials, or bulky articles such as cartons, or boxes, or granular materials.

(2) Description of the prior art

It is known to form such conveyors as a duct or trough through apertures in the base of which a gaseous medium under pressure is supplied from a plenum chamber, the apertures in some cases being shaped and disposed to direct the gaseous medium to assist in causing the articles to move along the duct or trough, the pressure of the gaseous medium issuing from the apertures being sufficient to build up beneath the articles or materials to raise them off the base of the duct or trough and entrain them in the gaseous flow.

The main object of the present invention is to provide such conveyors of improved construction and operation.

SUMMARY

According to the present invention a gaseous lift conveyor comprises a track along which articles may be carried on a gaseous medium, a pair of multi-apertured plates in the track and extending over at least a part of the width thereof, operating devices for causing relative movement between the plates, a plenum chamber communicating with the apertures, a source of fluid medium under pressure communicating with the plenum chamber, such that by relative movement between the plates passages through the superposed plates formed by overlapping portions of the apertures in the two plates may be varied in area to provide the required pressure and velocity on the track to raise and entrain the articles therein and/or provide a direction of movement along the track of the articles entrained in the gaseous medium. Preferably the track is in the form of a trough.

In one preferred construction where the track is in the form of a trough, the two plates, or at least the upper plate extends substantially across the width of the trough and forms the base of the trough. The apertures may be disposed in any pattern in the plates such as in lines across and/or longitudinally and/or diagonally of the trough.

In another construction the upper plate at least forms a longitudinal strip extending over a portion of the whole of the length of the trough.

Where at least the upper plate extends over a portion of the width of the trough, it may be formed by a number of such plates disposed side by side along the trough and each such upper plate may have a similar lower plate beneath it, or one lower plate may underlie some or all of the upper plates.

In addition to the aforesaid apertures, other apertures may be provided in the upper plate, which may open into the upper surface of the plate at an angle thereto to increase the pressure in the trough beneath the articles or materials being conveyed; or such additional apertures may open into the first named apertures in the upper plate, i.e. those which are in register with the apertures in the lower plate.

In some conveyors recesses are provided in the base of the trough into which apertures for the gaseous medium open, and in such conveyors these apertures or some of them may be in register with apertures in a lower plate of this invention.

The central portion of the base of the trough may be separate from the side portions of the trough base and the central portion may be adjusted in height to provide slots running longitudinally of the base through which one fluid medium under pressure from a first plenum chamber is directed into the trough, while a second fluid medium under pressure from a second plenum chamber and/or the first plenum chamber is also directed into the trough. In such a conveyor the side and/or central portions of the trough bottom may be formed of two plates each with apertures therein, relative movement between the two plates being effected.

BRIEF DESCRIPTION OF THE DRAWINGS

In order that the invention may be more fully understood some embodiments in accordance therewith will now be described by way of example with reference to the accompanying drawings, in which:

FIG. 1 shows diagrammatically a part of one form of conveyor trough;

FIG. 2 is a view similar to FIG. 1 of a second form of conveyor trough;

FIGURE 3 shows another view similar to FIG. 1 of a third form of conveyor trough; and, FIG. 4 is a diagrammatic side view of an air conveyor having a trough similar to that in FIG. 1.

In the drawings the same references are used to show the same or similar parts.

DESCRIPTION OF THE PREFERRED EMBODIMENTS

Referring to FIG. 1, this shows part of an elongated track forming a duct 1 having longitudinal side walls 1, 2 with a base 3 forming the bottom of a trough which is open at its top. Beneath the trough is a plenum duct 4 formed by the walls 1, 2 being extended downwardly and joined by a bottom 5. The base 3 is formed of two plates 6, 7, the lower plate 6 having apertures 8 therein and the upper plate 7 having apertures 9 therein generally in register with the apertures 8. One or both of the plates 6, 7 is movable relative to the other so that the area of the overlapping portions of the apertures 8, 9 may be varied, thereby varying the actual apertures through the base 3.

Any suitable means may be provided to effect relative movement between the plates 6, 7 such as cams or cranks, or solenoid devices and these may be operated in response to conventional means such as pressure sensitive elements responsive to the air pressure in the duct. Or the plates or one of them may be actuated by the operator to vary the movement of the fluid supported e.g. gasborne articles in the trough or to suit the size and/or weight of the articles being conveyed in the trough.

Referring to FIG. 2 this shows a trough formed in a similar manner to that shown in FIG. 1 but the base 3 of the trough is of different construction. This trough base is constructed with side portions 10, of which one is shown, and a central portion 11 which is wider than the gap between the two side portions 10 and is capable of being raised and lowered to close the gap or leave slits between its longitudinal edges and the contiguous edges of the portions 10. The side portions and/or the central portion is formed of two plates 16, 17 similar to the plates 6, 7 in FIG. 1 and operable as described with reference to FIG. 1. The apertures open into a plenum chamber 14, and a second plenum chamber 15 is shown for a separate gas supply to the apertures in the centre plate.

FIG. 3 shows another construction, similarly constructed as described with reference to FIG. 1, but the base 3 is constructed having recesses 18 formed in an upper plate 19 while the two plates 16a, 17a are shown as plates 6, 7 in FIG. 1 with the apertures 8, 9 formed in the two lower plates in register with the recesses. Relative movement is provided between the two plates as in FIG. 1. In FIG. 3 two superposed plates having recesses 18 in variable overlapping relation may be used in addition to the holes 8, 9 in the plates.

Referring to FIG. 4, a conveying apparatus is shown diagrammatically using a trough 1 as in FIG. 1, but it may be formed as shown in FIG. 2 or 3 or a combination of them over the length of the trough.

A feed in chute or table 20 is provided for loading articles into the trough by gravity or feed rollers or like means may be provided to feed the articles from the table 20 into one end of the trough, the other end having a take-off table.

The plenum chamber 4 is shown beneath the trough and air under pressure is supplied to the chamber 4 as by a fan 22 or like means, the inlet to which is indicated by the dotted line 23 in FIG. 4. To actuate one of the plates or both the plates 6, 7 a device 24 is provided actuating a linkage 25 connected to the movable plate or plates, one or more being provided for each plate if desired. This device may be an air or other fluid actuated cylinder the piston rod of which is the first link in the linkage 25. The plate or plates may be moved relatively one to the other by any suitable means which may be hydraulic, pneumatic, electrical, or even manual.

Where a second plenum duct is provided as in FIG. 2 this may be supplied with air under pressure by the fan 22 or a second fan coaxial with the fan 22 and driven by the prime mover thereof (not shown, but for example an electric motor). Alternatively the second plenum chamber may be supplied with air under pressure from a separate source such as a fan and this may be at a different pressure from the air in the first named plenum chamber.

The air or other gas supplied to the plenum chamber or chambers may be heated or cooled by known means to heat or cool the articles or maintain them at a predetermined temperature as they are conveyed in the trough.

The superposed plates have been described as flat, but they may be curved or corrugated or of other desired cross section, providing relative movement for the purpose herein described can be effected. The holes in each plate may be the same or different sizes and/or shapes and the pitch between the holes may vary over the length and/or width of the conveyor.

I claim:
1. A gaseous lift conveyor comprising a track along which articles may be carried on a gaseous medium, said track including a pair of superposed plates extending over at least a part of the width thereof, each plate having a plurality of apertures capable of alignment with apertures in the other plate to provide passages through the superposed plates, a plenum chamber communicating with the apertures, a source of fluid medium under pressure communicating with the plenum chamber, and means for causing relative movement between the plates such that the passages formed by overlapping portions of the apertures in the two plates may be varied in area to provide the required pressure and velocity on the track to raise and entrain the articles therein and may provide a direction of movement along the track of the articles entrained in the gaseous medium.

2. A gaseous lift conveyor according to claim 1 wherein the track is in the form of a trough.

3. A gaseous lift conveyor according to claim 2 wherein at least the upper plate extends substantially across the width of the track and forms the base of the trough.

4. A gaseous lift conveyor according to claim 1 wherein the apertures in each plate are disposed in a pattern in at least one of lines across the plate, lines longitudinally of the plate and lines diagonally of the plate.

5. A gaseous lift conveyor according to claim 1 wherein at least the upper plate forms a longitudinal strip extending at least a substantial portion of the length of the track.

6. A gaseous lift conveyor according to claim 2 wherein a number of upper plates are disposed side by side along the trough and each of said plates has a lower plate beneath it, said lower plate underlying at least two of said upper plates.

7. A gaseous lift conveyor according to claim 1 wherein additional apertures, in register with the said apertures are provided in a further plate superposed on said pair of plates.

References Cited
UNITED STATES PATENTS

| | | | |
|---|---|---|---|
| 1,971,853 | 8/1934 | Ihlefeldt | 302—29 |
| 3,094,223 | 6/1963 | Smith | 214—1 |
| 3,108,698 | 10/1963 | Petersen | 214—1 |
| 3,380,550 | 4/1968 | Jones | 180—128 |

ANDRES H. NELSEN, Primary Examiner